United States Patent [19]
Holman

[11] Patent Number: 5,346,235
[45] Date of Patent: Sep. 13, 1994

[54] BICYCLE SEAT POST SEATING AND CLEARANCE POSITIONING SYSTEM

[76] Inventor: Michael J. Holman, 45 Ranch View Rd., Rolling Hills Estates, Calif. 90274

[21] Appl. No.: 14,797

[22] Filed: Feb. 8, 1993

[51] Int. Cl.$^5$ .............................................. B62J 1/02
[52] U.S. Cl. ................................. 280/226.1; 280/283
[58] Field of Search ..................... 280/220, 226.1, 283

[56] References Cited

U.S. PATENT DOCUMENTS

| | | | |
|---|---|---|---|
| 3,948,542 | 4/1976 | Lukich | 280/226.1 |
| 4,212,480 | 7/1980 | Mikina et al. | 280/220 X |
| 4,653,766 | 3/1987 | Guandalini | 280/226.1 |

FOREIGN PATENT DOCUMENTS

| | | | |
|---|---|---|---|
| 172131 | 8/1952 | Austria | 280/220 |
| 3837018 | 5/1990 | Fed. Rep. of Germany | 280/220 |
| 1361392 | 4/1964 | France | 280/283 |

Primary Examiner—Margaret A. Focarino
Assistant Examiner—Carla Mattix
Attorney, Agent, or Firm—Ladas & Parry

[57] ABSTRACT

A pivoting seat system that enhances performance, convenience, safety, and the general appeal toward comfort as well as control of targeted muscle groups to exercise. The stationary bike, recreational, and avid professional bicycle rider can utilize this system as it maintains proper seating positions and optimum leg pedaling lengths throughout its rearward movements, and also offers both rearward and forward seat clearances while standing on the pedals in adverse terrain conditions, such as varying downhills, and downhill with obstructions, turns, curves, etc. The seat locking and releasing system is controlled by activation of a release lever on the handlebar, and is body weight driven in the rearward positions and spring loaded toward movement in the forward positions. Its unique parallel bar technology allows for the seat to remain in the same orientation throughout all its desired positional movements.

19 Claims, 12 Drawing Sheets

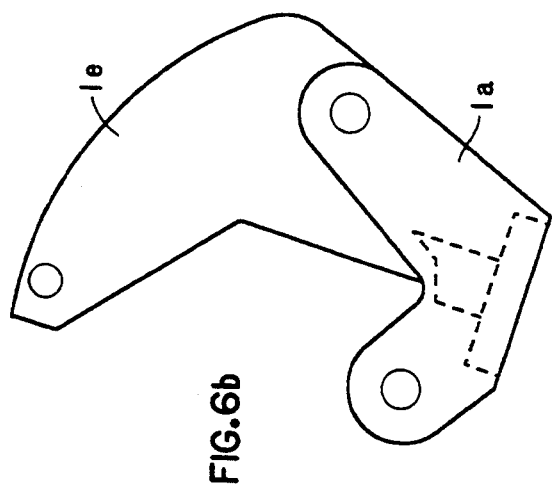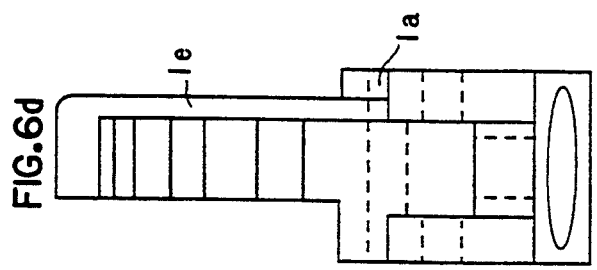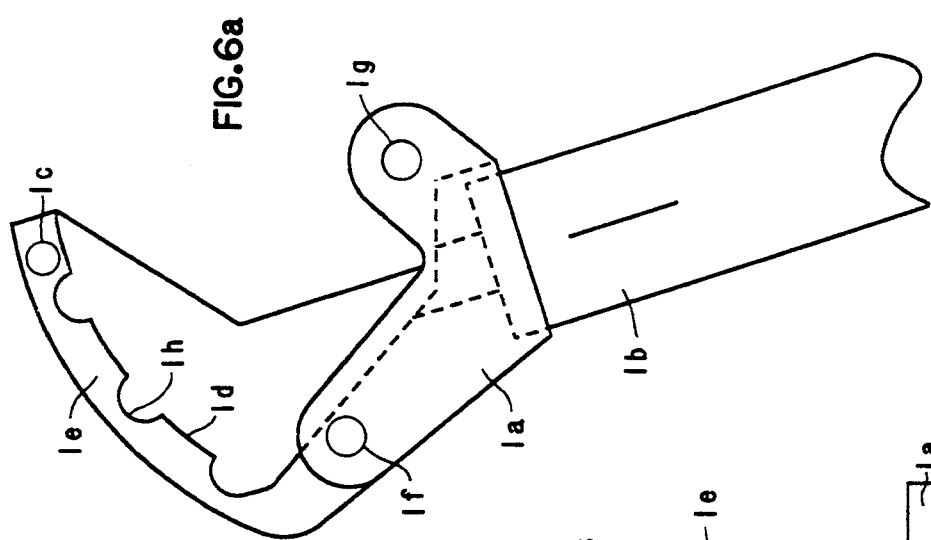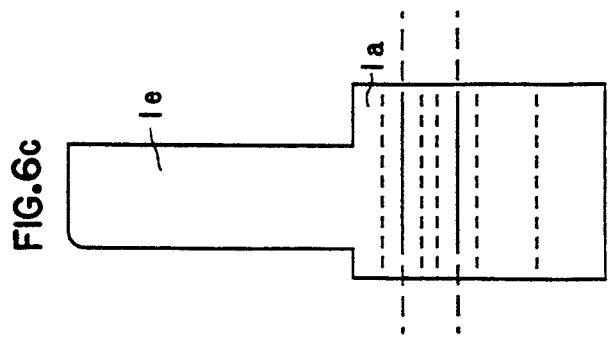

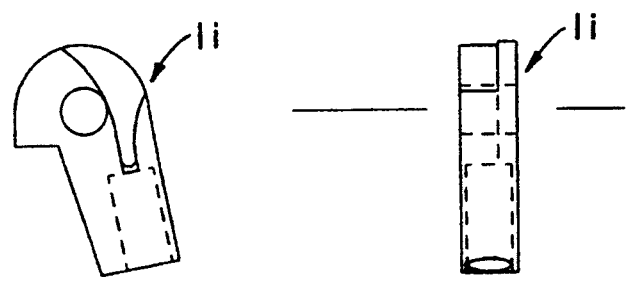
FIG.7a FIG.7b
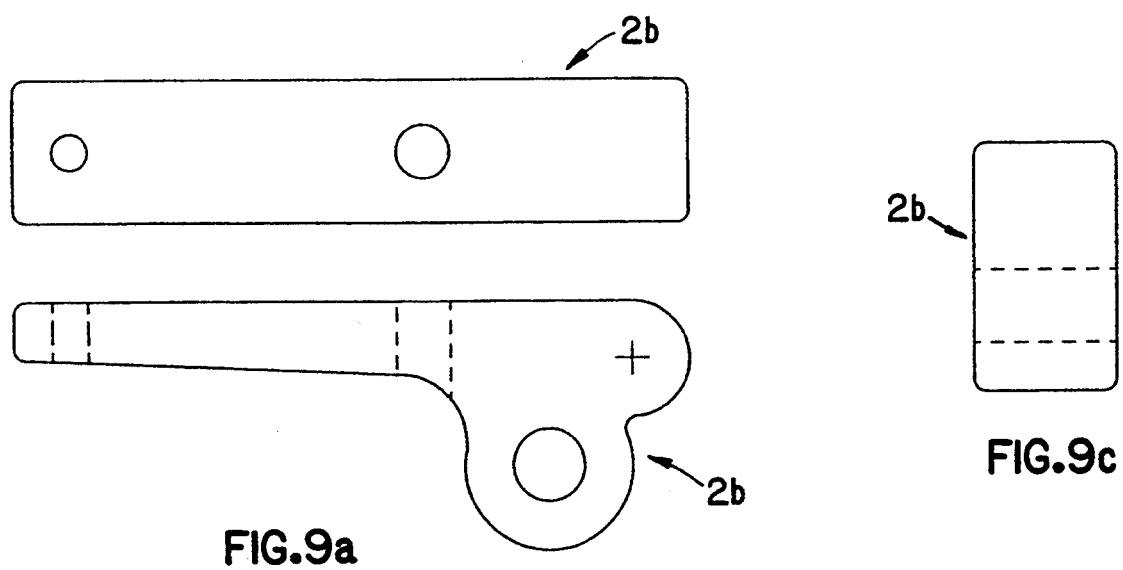
FIG.9b
FIG.9a FIG.9c

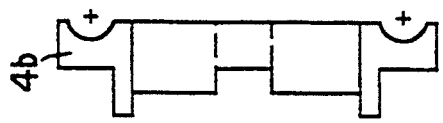
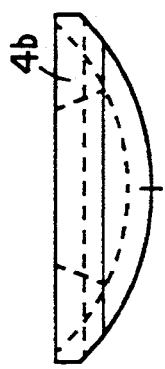
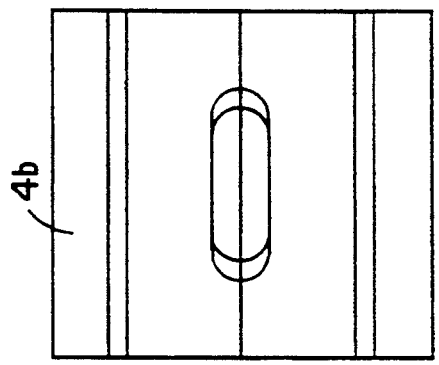
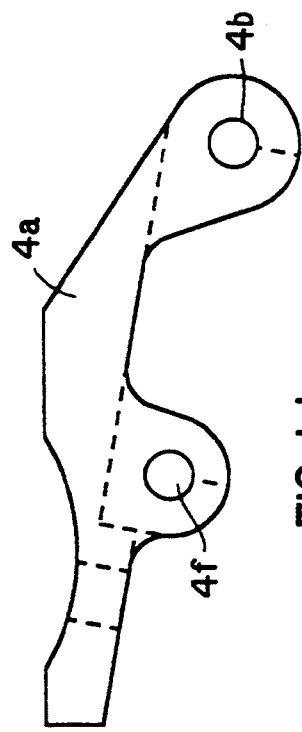
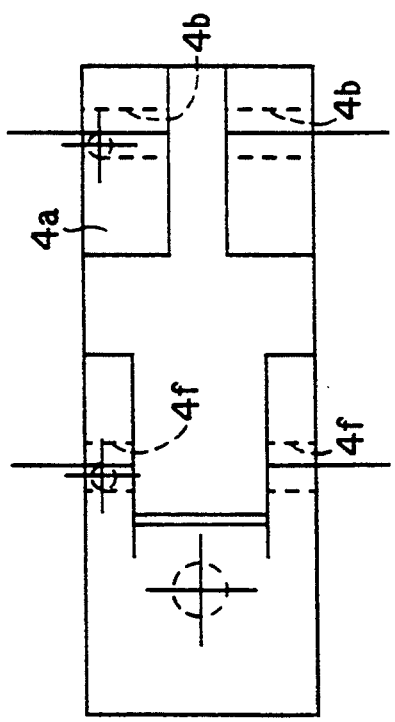

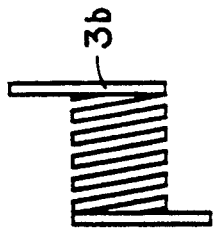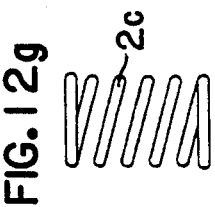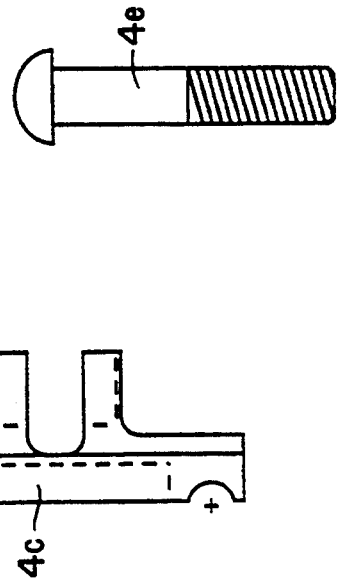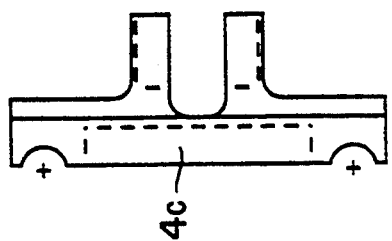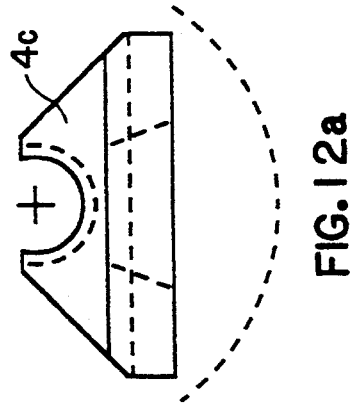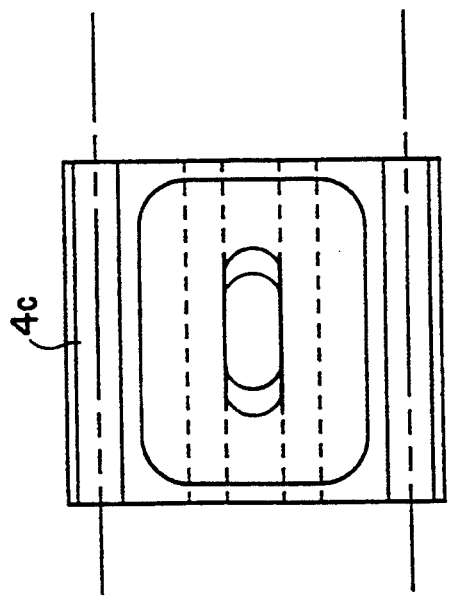

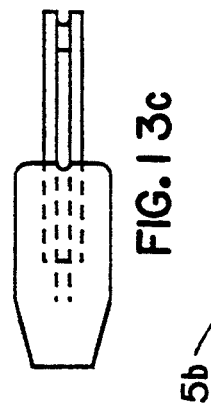
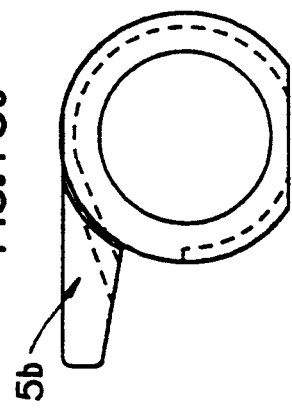
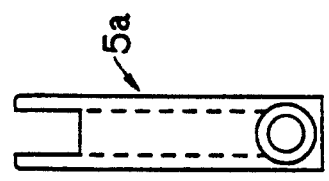
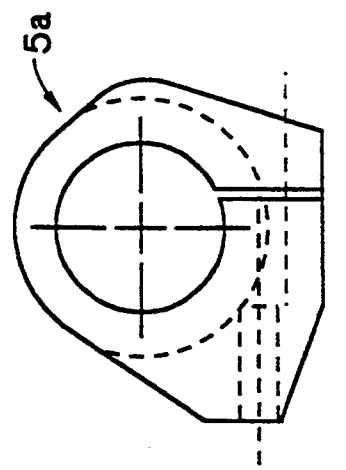

BICYCLE SEAT POST SEATING AND CLEARANCE POSITIONING SYSTEM

BACKGROUND OF THE INVENTION

This invention relates to the field of bicycling, to be utilized with stationary exercise bicycles, mountain bicycles, and road bicycles. Its most important application would be used on bicycles for the avid mountain and road cyclists riding on hilly or mountainous terrain. Additionally, the average or "Sunday" rider can benefit from the numerous applications, conveniences, and adjustments that enhance comfort, lowered overall ride wind resistance, ridability, and safety to the user.

BRIEF DESCRIPTION OF THE PRIOR ART

In the physics of bicycling, and most importantly mountain bike riding, the rider must constantly shift his or her weight (hereinafter referred to as body English) to compensate for the terrain being transverse. In varying degrees of downhill riding where the terrain is rough or obstacle ridded, the cyclist must either normally remain seated and control his or her speed to a comfortable rate or stand up on the pedals removing the cyclist's weight off of the seat.

Research has shown that the optimum position seating is for the seat to be at a height that allows for approximately 15 degrees leg bend (from being straight) when the rider's foot is at the lowest pedal position and for the seat post to be positioned rearwardly of the pedal crank and along a line passing through the pedal crank at an angle of approximately 71 degrees from the horizontal. However, this formula is based primarily on the use of the bicycle on level terrain, and it is found that, while lowering the seat height to allow for substantial downhill terrain, which offers more stability, safety and control for the terrain, the position lacks the required leg length and positioning requirement for optimum performance.

The importance with staying seated is that the center of gravity changes corresponding with the angle of the downhill grade. This center of gravity is further affected if the hill consists of curves, turns, or obstacles that required maneuvering body English. The performance of the rider is seriously affected by having to lower the bicycle's speed to compensate for unstable conditions.

If the rider chooses to lift his or her weight off the seat of the bicycle (whether coasting or pedaling) to transverse the terrain, he or she significantly increases the amount of energy used and the wind resistance effect, thereby lowering his or her total overall stamina. Subsequently, performance and stamina is substantially affected if weight is shifted off the seat when riding on terrain where the downhill grade is of a moderate level allowing for pedaling for maximum speed.

In recent years, the invention of and mass use of front shock absorbers has hit the marketplace. Even though this front suspension system offers the rider a great improvement in performance, the effect of modest to quick front braking action (approximately 80% of stopping power is on the front brake) causes the front forks to depress or compress, since the body and bicycle inertia are in the forward direction. As most of these shock absorbing systems have approximately 2" of travel, a modest to quick front braking action, especially on an even slight downhill incline, will cause the bicycle to instantly nosedive 2" or more (up to 4") in soft terrain as the front wheel digs into the dirt. This instant action causes the bike to dive forward with a pivoting or flipping action that can only be offset by a preexisting or instant rearwardly and downwardly body weight placement.

Furthermore, another concern to some riders is the exercising of their leg muscles. It has been found that even slight movements of seat position will work either different muscles and/or different parts of the muscles, than a normal seat position "seat post" which allows only one optimum seat position.

In the aspects of street and road bike riding, the cyclist is concerned about traversing down hills that contain significant curves and/or turns, because the rider's center point of gravity (same as in the mountain bike applications) is not in the most optimum position at the normal or standard "top dead center position".

Storage and transportation of bulky bikes can also be problematic. The protruding seat posts of normal bikes affect the ability of the owner to handle the bike. The ability of the seat to be positioned closer to the frame reduces the area needed for storage and transportation. Additionally, the parking of such bikes would require less space and thus allow the rider to fit the bike into a smaller area for parking (like under stairs, in a car truck, or in the back seat of a car).

In view of these issues and others, it is clear that an "on-the-fly" adjustable seat positioning system is needed, one that is extremely light, inexpensive, and easily controlled.

SUMMARY OF THE INVENTION

In this description the following definitions and conventions are to be understood:
- the terms "bike" and "bicycle" are equivalent terms and will be used interchangeably;
- the terms "bike" and "bicycle" include mountain bicycles, road (or street) bicycles, and stationary ( or gymnasium-type exercise) bicycles, the latter including cycles with only one wheel;
- the phrases "top dead center position" and "top centerline position" mean the normal or standard seat position, i.e. the seat is positioned along a line passing through the pedal crank axis and at an angle of about 18 degrees from the vertical, and generally rearward of the pedal crank;
- the term "body English" means the maneuvering of the rider's body to shift his or her center of gravity to compensate for changes in the terrain;
- the phrase "on-the-fly" means while the rider is riding; and
- the term "stowaway position" means that position of the seat in which the seat is moved to an out-of-the-way position for easy storing of the bicycle.

This invention relates to a seating system for road bike, mountain bike and stationary bake applications:
- that places the rider to the most preferred seating position on demand;
- that greatly improves seat and seat post clearance when the rider is traversing terrain that requires the rider to stand and utilize body English;
- that offers the rider the ability to adjust the seat positions for resting one group of muscles as another group or section of muscles is exercised;
- that offers the convenience that a single bicycle can easily accept riders of varying heights and place them in their individual best seating positions without the hassles of the normal seat adjustment requirements (in the more forward positions of the seat adjustment);

that gives the ability to increase traction, as well as reduce side inertia while cornering;

that gives the ability to adjust the rider's center of gravity;

that gives the ability to adjust the seat rearwardly (adjusting seating and body position in line with the downhill angle when encountering downhill situations;

that can assist in compensating for fork compression (nosediving while braking) when the bike is equipped with front shocks;

that offers a rider the ability to traverse downhill situations faster and with greater stability and safety by allowing a combination rearward and downward seat movement, while maintaining approximately the same leg length throughout the top centerline to rearward positions to allow for continued pedaling while maintaining optimum leg length (seat-to-pedal); and that offers an adjustable seat position (forward and rearward) while exercising which allows the rider to customize his or her workout, and achieve a better aerobic fitness conditioning, accomplished by working different muscle groups without dismounting the bike and making manual adjustments, i.e., the on-the-fly seat positioning adjustment allows the rider to compensate (in myriad ways) at will to any desired, or prescribed position.

MECHANICAL ATTRIBUTES OF THIS INVENTION

There are five primary mechanical attributes to the seating system of the present invention. The first is the method of positioning, the second is the method of locating or registering, the third is the method of locking or clamping the unit, the fourth is the method of activating the locking or clamping device "activation controller", and the fifth is the mounting of the adjustable post system to the seat. This description is focused on describing the method and apparatus for positioning the seat in an arced movement for the applications as referenced above; this is the primary feature of the invention. The possible methods of activating, registering, locking (to selected positions) and clamping the seating system to the bicycle frame and seat are numerous and give the artisan many alternative choices. However, any representation of the preferred embodiment including but not limited to the unique locking cam system specifically described herein, and any other description that addresses a locating or registering, locking or clamping system shall also be considered part of this invention.

BRIEF DESCRIPTION OF THE DRAWINGS

The invention will now be described in detail having referenced to the accompanying drawings in which:

FIGS. 6a-6d show details of the arced locking cam member and frame post mountable to the bicycle frame;

FIGS. 7a and 7b show details of the cam cable guide;

FIGS. 9a-9c show details of the locking lever;

FIGS. 11a-11e show details of the top bracket and swivel for mounting the seat assembly;

FIGS. 12a-12h show details of the seat top clamp assembly; and

FIGS. 13a-13d show details of the handlebar release unit.

DETAILED DESCRIPTION OF THE PREFERRED EMBODIMENTS

Positioning Attributes

Figure 1:
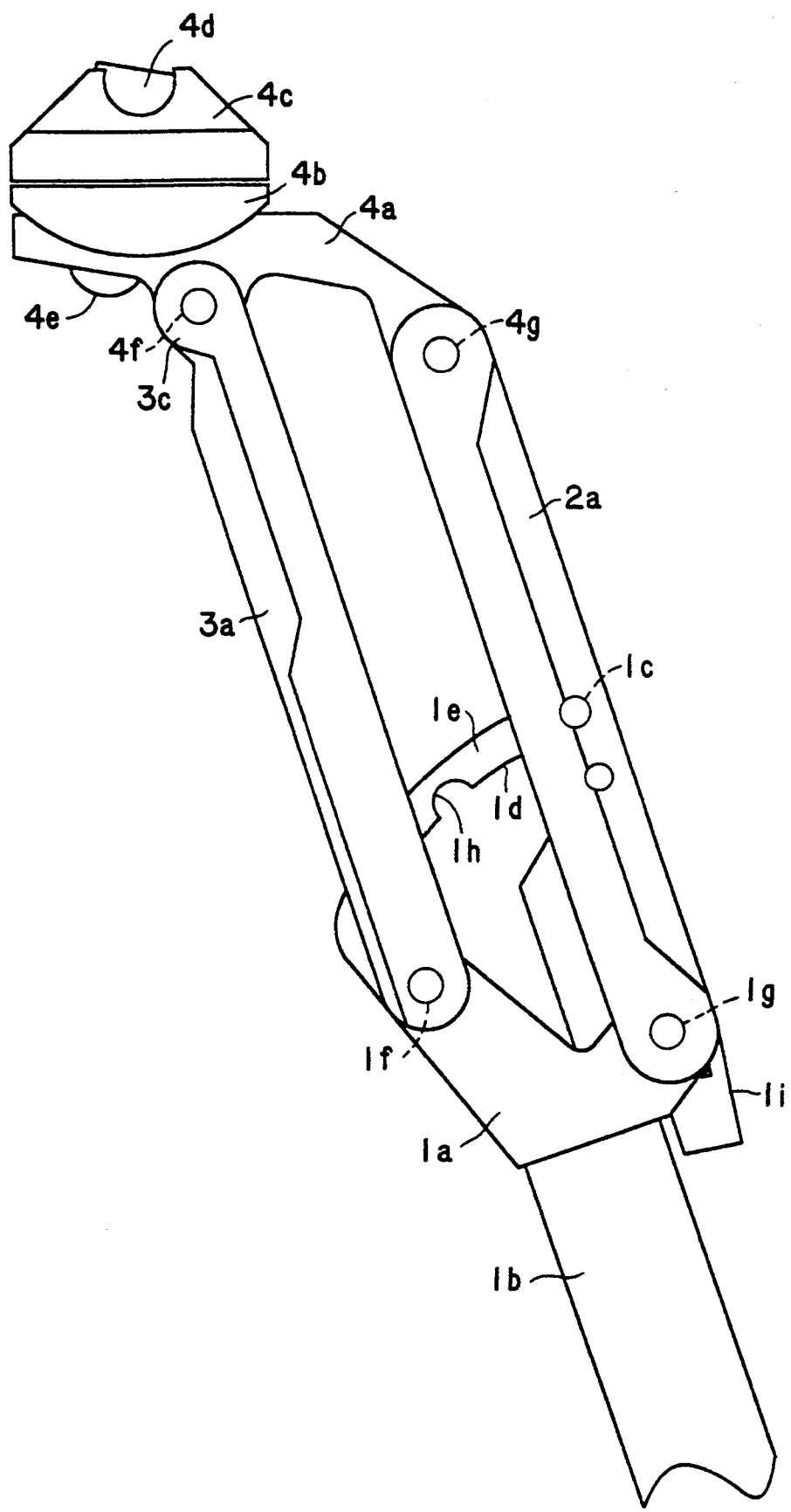
FIG. 1 is a right side elevation view of the seating system in its "top dead center position" (the position at which a normal seating post would place the rider adjusted to the most efficient seating position)
Figure 2:
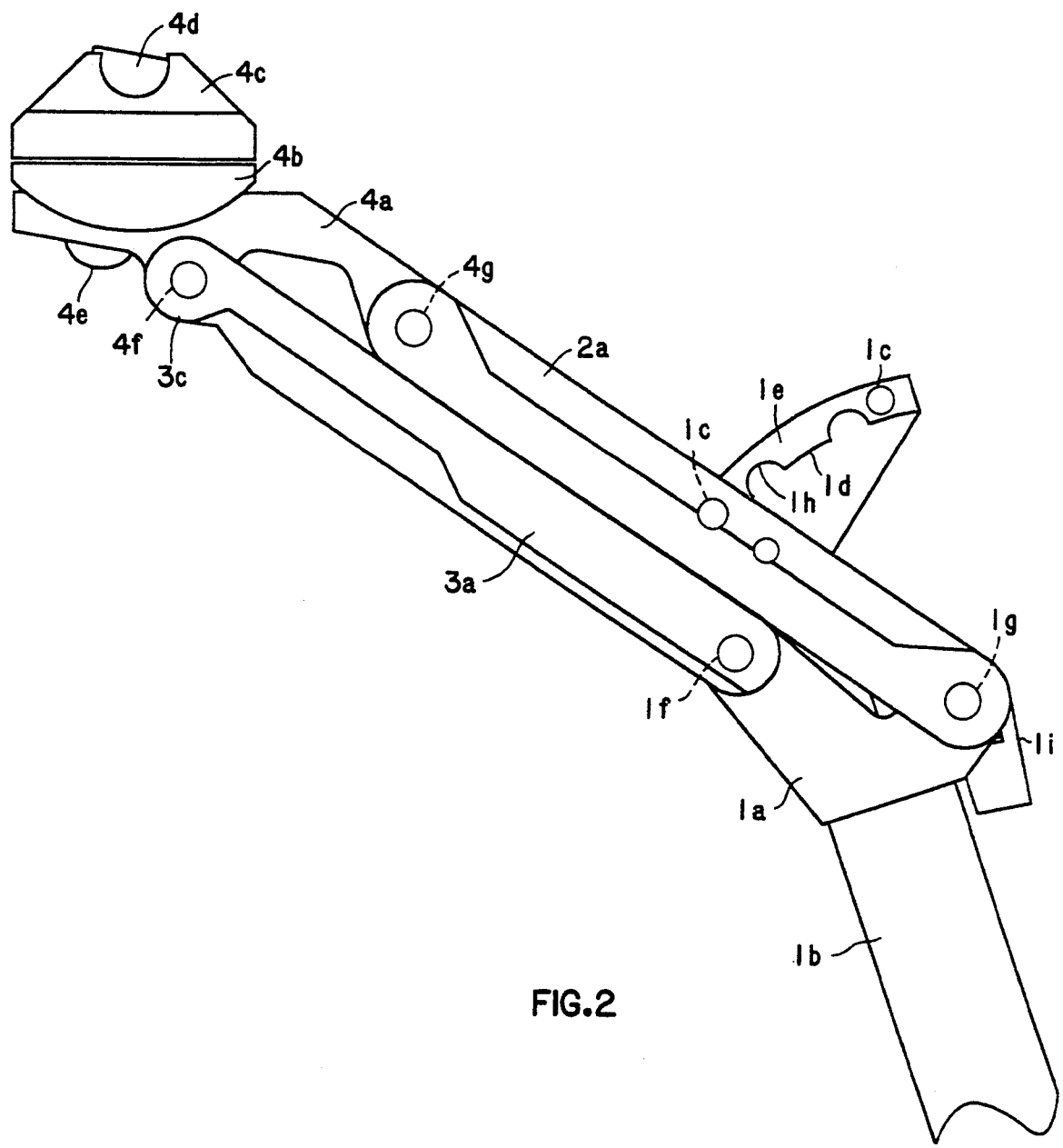
FIG. 2 is a right side elevation view of the seating system in its rearward position(s)
Figure 3:
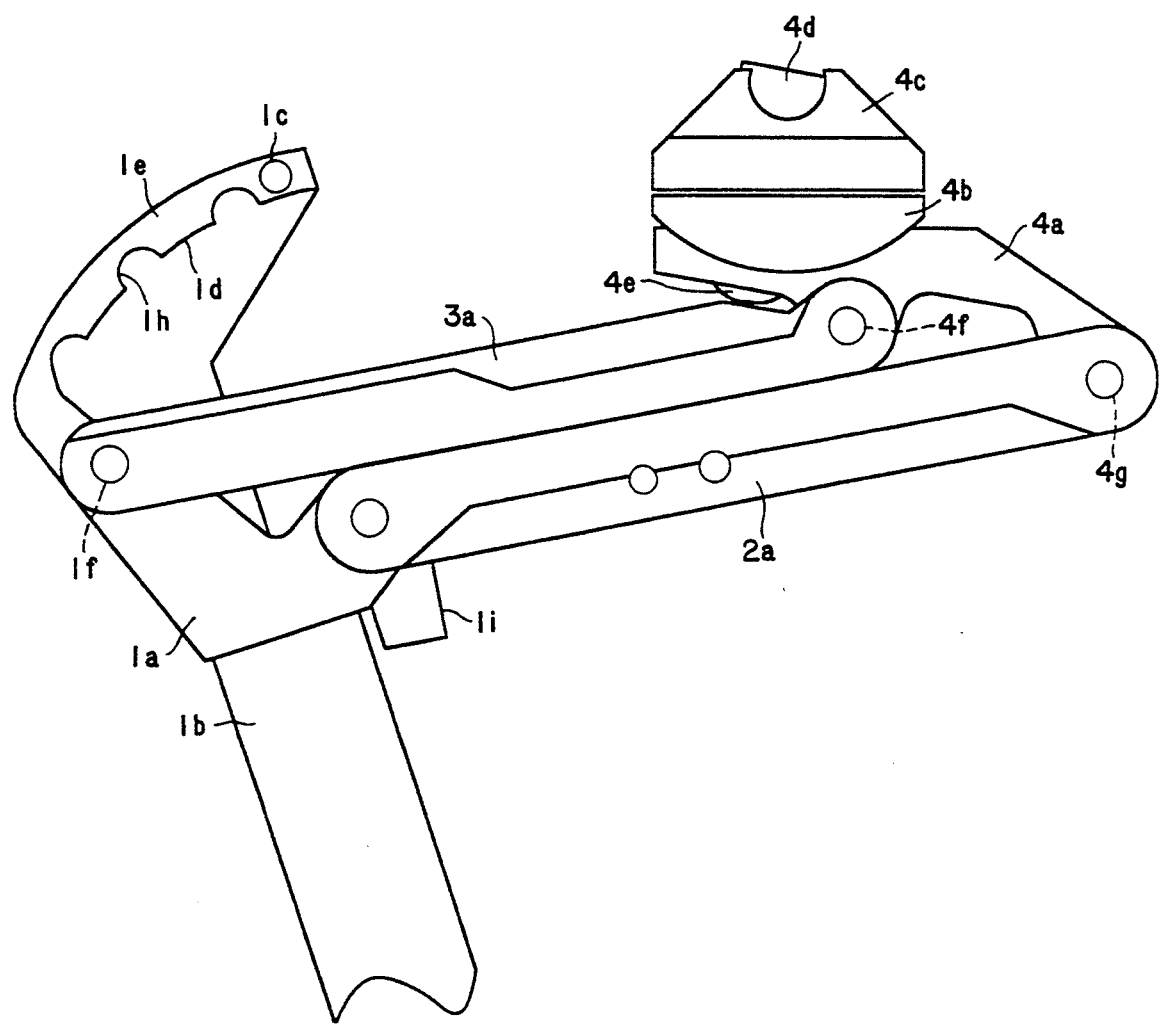
FIG. 3 is a right side elevation view of the seating system in its forward stowaway position.
Figure 4:
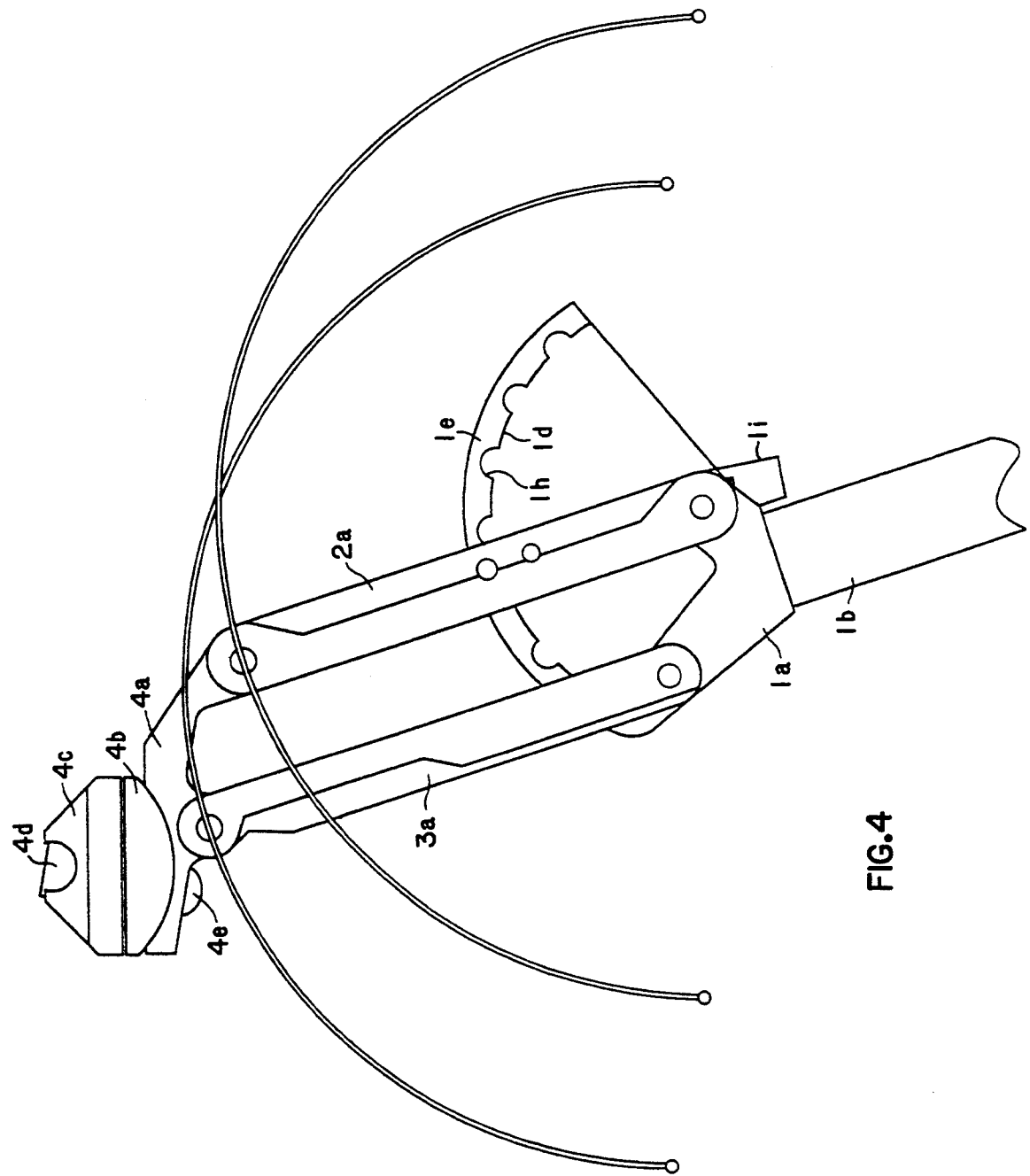
FIG. 4 is a right side elevation view showing the range of positions for the pivot system that may be utilized to accommodate the various stationary bike and ridable bicycle frame styles, as well as an individual rider's desire.
Figure 5:
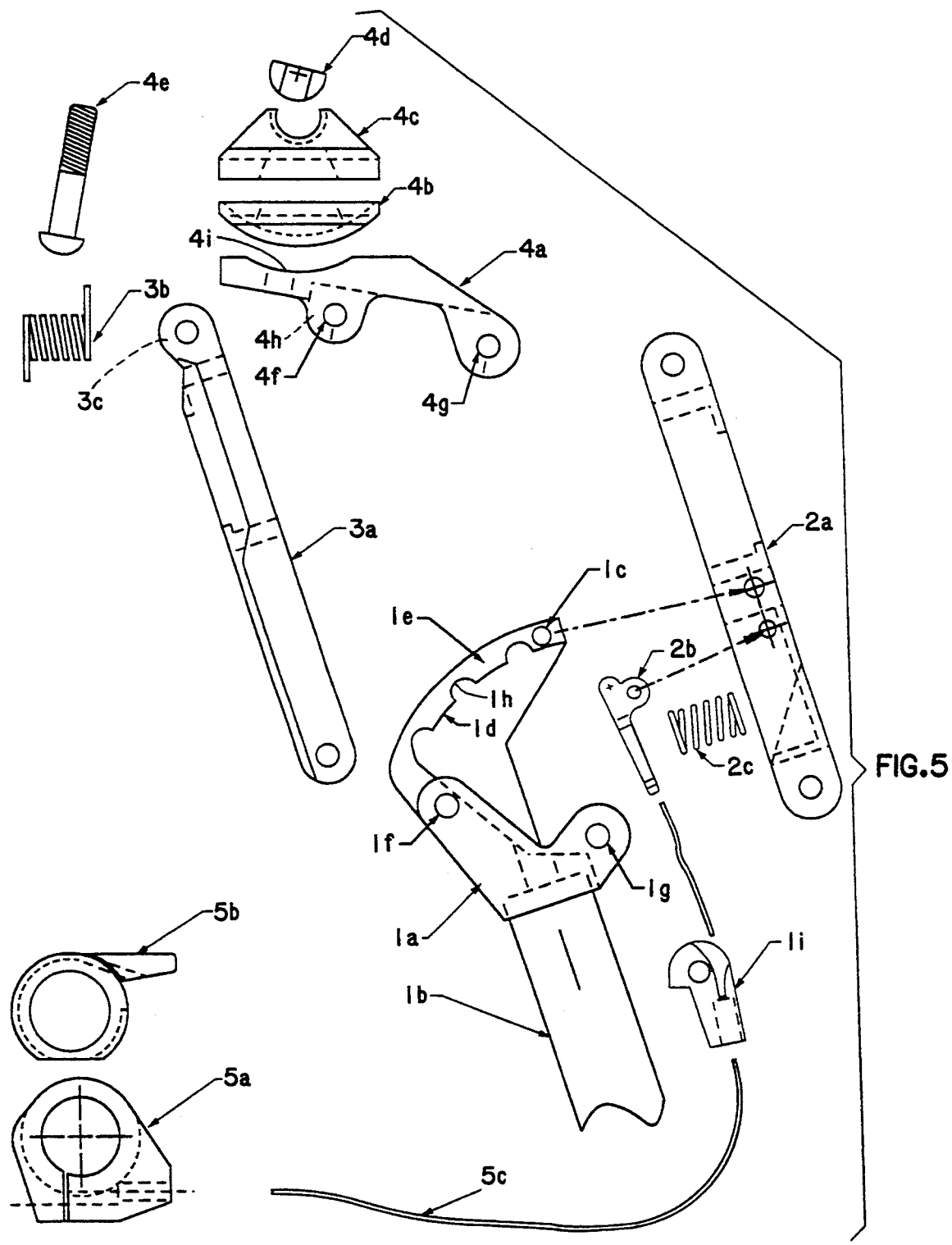
FIG. 5 is an exploded view of the components of the preferred embodiment assembly.
Figure 8C:
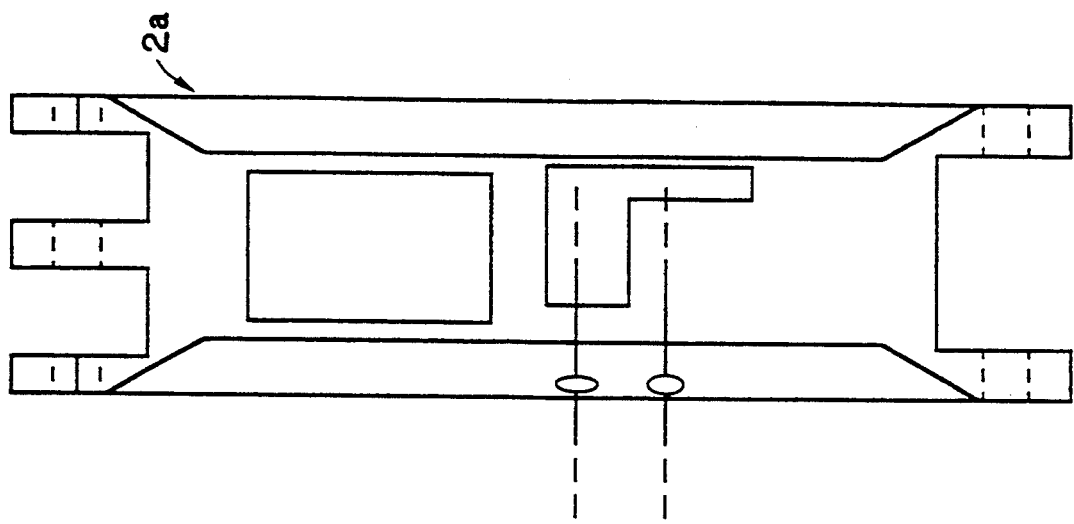
FIGS. 8a-8c show details of the front bracket joining the seat arrangement with the locking cam and frame post.
Figure 8B:
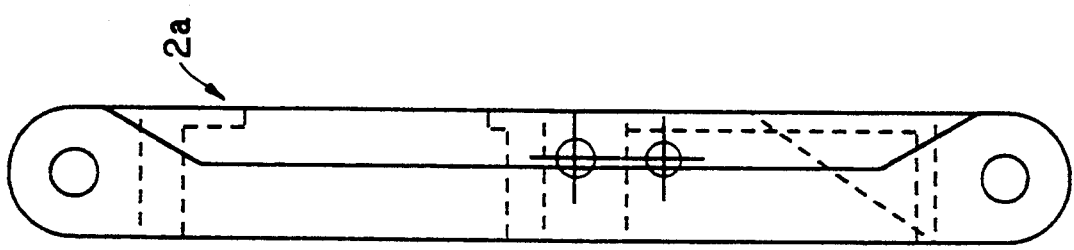
Figure 8A:
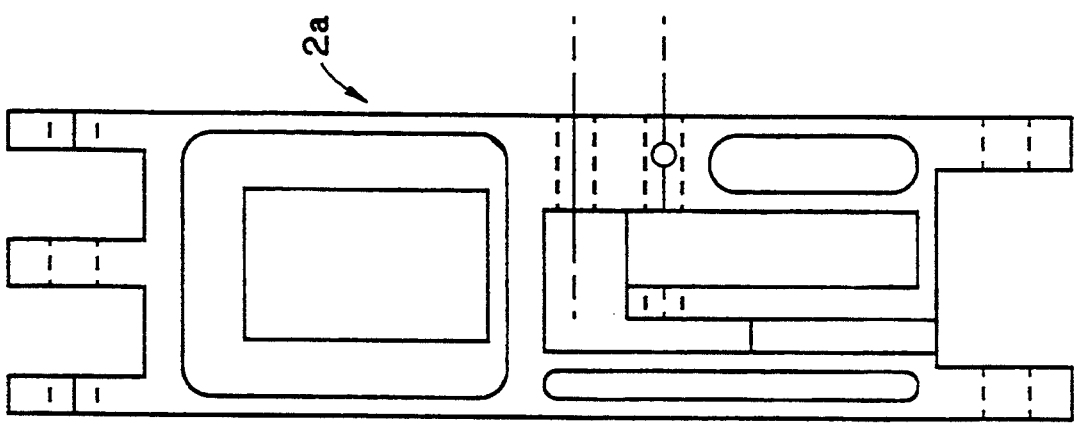
Figure 10C:
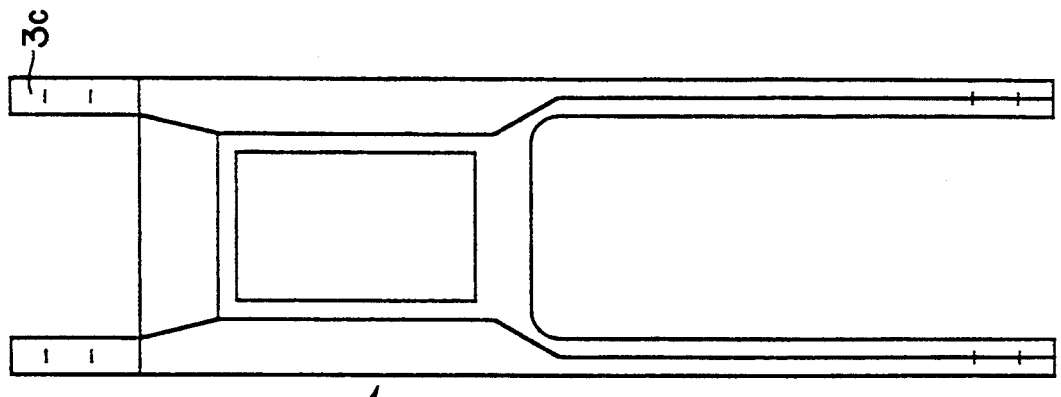
FIGS. 10a-10c show details of the rear bracket joining the seat arrangement with the locking cam and frame post.
Figure 10B:
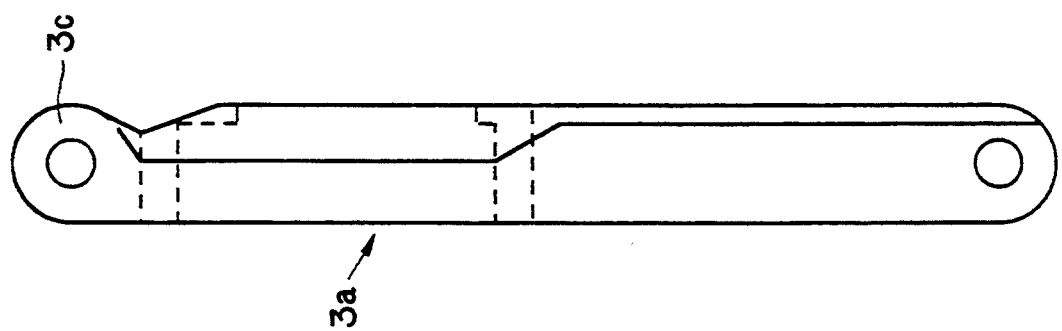
Figure 10A:
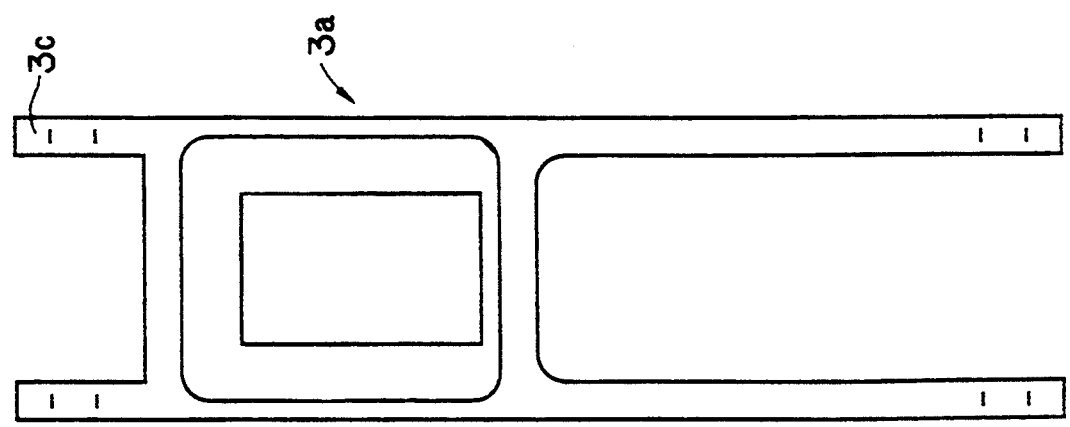

Referring to FIGS. 1-5, the preferred embodiment utilizes a unique design of parallel bars 2a and 3a to maintain the seat parallel throughout its travel. The standard diameter post tube 1b mounts to a base 1a that also serves as the mounting bracket for the bottom ends of the parallel bars 2a, 3a. In the described preferred embodiment, the interior of base 1a contains an arced rack configuration 1e that extends upwardly to support a series of detents 1h for positioning contact with the spring loaded locking member 2b biased into a selected detent by spring 2c.

The top section of the parallel bars 2a, 3a mounts to a top bracket 4a. This top bracket 4a also mounts the entire unit to a standard seat using elements 4b, 4c, 4d, 4e to be discussed later.

A forward swing tensioning spring 3b is placed in a pocket 3c, 4h around the rear parallel bar 3a upper mounting location. A cosmetic cable guide 1i is mounted between the front parallel bar 2a and the mounting base 1a. Both parallel bars are designed to alleviate any obstructions of movement relative to the other components of the unit, to lighten the overall weight, as well as provide for mounting such items as the locking and locating elements 2b, 2c.

Locating Attributes

The preferred embodiment utilizes the parallel bars 2a, 3a contacting each other when the locating element is in the most forward (FIG. 3) and most rearward (FIG. 2) positions. It should be noted that the placement of the rear mounting holes 1f, 4f in relation to the front mounting holes 1g, 4g in the bottom mounting base and top mounting bracket 1a, 4a controls the most forward and rearward positions of the seating positioning system. The "top dead center position" (FIG. 1) and a range of interim rearward positions (and range of forward positions on the stationary bike version of FIG. 4) are selectable by the spring loaded locking lever 2b locking into position under the influence of spring 2c. As an additional control feature, a forward "centerline positioning retainer" 1c is provided to prevent the undesired occurrence of the seat spring 3b moving the seat forward beyond the "top dead center position". The preferred embodiment utilizes a standard ball plunger 1c to prevent this forward movement to a stowaway position, unless intentional and substantial force is used, releasing the effects of the retaining lock 1c by pushing forward on the rear of the seat by the rider's thighs while riding, or by hand when off the bike.

Clamping Attributes

The preferred embodiment utilizes a ratchet-locking system 1e, 2b, 2c to lock the locking lever 2b to the detented interior rack surface 1d on a supportive arc brace 1e.

Throughout the development of this preferred locking system, it has been found that over thirty various designs could work, the following being a brief overview of designs that those skilled in the art could use:

| | |
|---|---|
| side clamping | locking ball |
| locking bracket | hydraulic actuators |
| pneumatic actuators | clutch |
| wedging cam | |

Activating Controller Attributes

The preferred embodiment utilizes a standard bike gear shift cable 5c installed into the release lever assembly 5a, 5b with the opposite end of the cable 5c attached to the locking lever 2b, routed through the cable guide 1c for support and alignment. By pressing on the release lever 5b, the cable is pulled further into the housing 5a; thereby at the opposite end, the locking lever 2b retracts to allow for movement of the bars 2a, 3a and locking lever assembly 2b, 2c to more relative to rack member 1e. For safety and convenience, the release lever assembly 5a, 5b is placed on the handlebars within fingers reach of the hand grips.

Seat Mounting Assembly

The preferred embodiment utilizes a unique assembly which enhances the ease of installation as compared with the standard seat post-to-seat mounting clamps. The assembly allows the clamping screw 4e and the locking nut 4d to remain stationary while upper and lower rocker elements 4b, 4c (trapping the standard mounting rails on a standard seat) pivot on the contour of the radius of the locking nut 4d and the corresponding concave radius surface 4i of the top bracket 4a to obtain the desired angle of the seat during the initial installation of the "seat positioning system" relating to the bike.

DETAILED DESCRIPTION OF THE INVENTION IN OPERATION

Mountain Bike

As a mountain bike rider, the rider sees that the upcoming terrain is of a downhill nature, with obstacles and turns. The rider, upon entering this zone, presses a lever 5b within finger tip reach of handlebar grips as he or she presses back on the seat, moving the seat to the desired rearward position. Upon releasing the lever 5b, the seat locks in place. This action moves the rider's gravity center point rearwardly to reasonably match the downhill angular change. Additionally, as the seat is moved rearwardly, it is also lowered to further enhance stability and safety and maintain substantially the same leg length from seat to pedals.

As an additional option for the avid mountain bike rider; when the rider encounters severe downhill terrain he or she has an additional alternative of pressing forward on the seat beyond the top centerline position, releasing the centerline position retainer 1c, allowing the seat to drop to the forward stowaway position for total seat clearance. This position can be easily reset to top centerline or rearward positions by depressing the handlebar release lever 5b while allowing the thighs of the leg to trap the curvature of the back portion of the seat, and pushing rearward against the tensioning spring 3b, to the approximate desired position and then releasing the lever.

Contrary to some methods of just lowering the seat, this rearward and downward arc movement has only a minor impact on the optimum "seat-to-pedal" leg length. This feature gives the rider the ability to pedal and/or conserve energy by being seated while traversing down the hill at optimum (including racing) speeds.

As the hill becomes increasingly steep, the rider presses the lever 5b to release and lock the locking lever 2b to locate the seat at the furthest rearward position, while doing perhaps a combination of pedaling and coasting which is now possible, depending on the coasting speed the downhill offers and the obstacles encountered in the terrain.

The rider then views ahead that the terrain is increasingly rough, and/or steep, requiring standing on the pedals, removing the rider from the seat. If the seat isn't already in the furthest rearward position, the rider then places it there, or to the stowaway position (as described above). As the rider, while standing, shifts his or her weight back and downwardly he or she realizes a significant maneuverable mobility over the common post system where the thighs, or hip through chest section, would come in contact with the top or rear of the seat. Through this additional clearance, the rider can achieve unobstructed body English movements for effecting increased stability, speed, and control safety. This feature also works well on extremely steep uphills when the rider is required to stand while pedaling.

Upon the completion of the downhill span, the rider (unless desiring the exercise of other muscle groups) depresses the positioning lever 5b, and while holding the lever removes his or her weight on the seat (a natural split second event) causing the seat to spring forward (by spring 3b being installed in a pre-load tensioned condition) to the top dead center position (or a secondary position by limiting the travel forward by either a cam stop (not shown) built into the unit 1c or by obstructing the forward movement with the back of the rider's thigh muscle). This action of seat movements, at will in any combination, continues at the discretion of the rider throughout the day, until the ride is complete.

Road or Street Bike

In most unobstructed road or street bike downhill conditions, a straight downhill event does not bring much concern; however, when the downhill path also encompasses curves, turns, or obstacles, the cyclist encounters significant concerns of stability as related to lowering the center of gravity and placing his or her weight rearwardly. As the rider sees or suspects this potential downhill slope with the combined occurrence of turns, curves, or obstacles, the rider presses the lever 5b within finger reach at the normal hand positions, and adjusts the seat to a rearward and downward position to compensate for change in terrain. As the concerned area is passed, the rider then presses the lever 5b, lifts his or her weight off the seat a the seat springs forward due to the stored energy in spring 3b while releasing the lever 5b as it locks into the "top dead center", or other selected position.

This event, in any combination, continues at the discretion of the rider throughout the day and may include varying the resting of or exercising of muscles until the rider has completed his or her ride.

Exercise Bike Applications

The floating parallel seat positioning system according to the present invention when used in connection with stationary bikes, could be further enhanced due to the elimination of the extreme weight concerns associated with normal transporting bicycles. The floating seating system allows the stationary or exercise bike user an increased additional "full arc swing" giving the rider variable adjustments on his or her workout without interruptions to the exercise routine.

On demand, adjustments can be made for the length of the rider's legs in the forward adjustment positions while maintaining nearly constant leg lengths in the rearward positions. This system offers the exerciser the ability of choice to work different muscle groups (such as preparing for a ski trip) without dismounting and making the limited straight line dropping adjustment as is necessary with ordinary bikes. The results offer a great improvement over current exercise bike seat positioning technology.

Storage And Transportation

The owner and user of a bike fitted with the seating system of the present invention will have the ability to store or move the bike in a better or more compact area without the necessity of removing the seat. Examples would include parking the bike in a stairwell, storing an exercise bike in a closet, and increased opportunities of fitting the bike into a typical car trunk.

I claim:

1. A cycle saddle mounting assembly for mounting at a fixed location on a cycle frame in an upwardly projecting tubular frame member of the cycle frame having means for journaling a crank supporting a pair of cycle pedals, said assembly comprising:
   a unitary frame mounting means for mounting said assembly in said tubular frame member;
   saddle mounting means for accommodating the mounting of a cycle saddle thereon; and
   articulated linkage means, coupled between said unitary frame mounting means and said saddle mounting means, for operatively moving said saddle mounting means to, and securing said saddle mounting means at, selected positions along a path relative to said frame mounting means between a predetermined standard riding position and a relatively more rearward position; and wherein
   said linkage means is operative to move said saddle mounting means to positions forward of said standard riding position, whereby the distance between said saddle mounting means and the crank of the cycle pedals lessens as said saddle mounting means is moved further forward.

2. The assembly as claimed in claim 1, wherein said linkage means includes means for securing said saddle mounting means to at least one intermediate position between said standard riding position and said rearward position.

3. The assembly as claimed in claim, wherein, forwardly beyond said standard riding position, said linkage means is freely movable to position said saddle mounting means at a stowaway position substantially in the same horizontal plane.

4. The assembly as claimed in claim 3, wherein said linkage means includes means for securing said saddle mounting means at said stowaway position.

5. The assembly as claimed in claim 1, wherein said linkage means comprises spring means acting to bias said saddle mounting means toward said standard riding position.

6. A cycle saddle mounting assembly for mounting at a fixed location on a cycle frame in an upwardly projecting tubular frame member of the cycle frame having means for journaling a crank supporting a pair of cycle pedals, said assembly comprising:
   a unitary frame mounting means for mounting said assembly in said tubular frame member;
   saddle mounting means for accommodating the mounting of a cycle saddle thereon; and
   articulated linkage means, coupled between said unitary frame mounting means and said saddle mounting means, for operatively moving said saddle mounting means to, and securing said saddle mounting means at, selected positions along a path relative to said frame mounting means between a predetermined standard riding position and a relatively more rearward position; and wherein:
   said path is an arcuate path concavely facing downwardly;
   said frame mounting means comprises an arcuate rack member arced in an orientation substantially concentric with said arcuate path of said saddle mounting means, said rack member having a plurality of registration means spaced therealong; and
   said linkage means comprises a locking element movable between a first position at which said locking element is free to pass adjacent said registration means without engagement therein, and a second position at which said locking element is forced into engagement with one of said registration means.

7. The assembly as claimed in claim 6, wherein said registration means is defined by a plurality of detents spaced along said arcuate rack member, and said locking element includes a dog member selectively engagable in any one of said detents.

8. The assembly as claimed in claim 6, wherein movement of said locking element to said first position is effected by the application, to said locking element, of manual force by a cycle rider.

9. The assembly as claimed in claim 8, wherein:
   said securing means includes a spring means; and
   movement of said locking element to said second position is effected by biasing action of said spring means.

10. The assembly as claimed in claim 8, wherein said arcuate rack member comprises a stop means adjacent the forward most end of said arcuate rack member and engageable with said locking element to inhibit the passage of said locking element forwardly substantially beyond the forwardmost one of said registration means.

11. The assembly as claimed in claim 10, wherein, when said locking element is in engagement with said forwardmost registration means, said seat mounting means is positioned in a predetermined riding position.

12. The assembly as claimed in claim 10, wherein said locking element is selectively movable past said stop means by the application of additional force to said locking element, exceeding said applied manual force, by the cycle rider.

13. The assembly as claimed in claim 8, wherein said arcuate rack member comprises a stop means adjacent the forwardmost end of said arcuate rack member and engageable with said linkage means to inhibit the passage of said saddle mounting means forwardly substantially beyond the forwardmost one of said registration means.

14. The assembly as claimed in claim 13, wherein said linkage means is selectively movable past said stop means by the application of manual force to said linkage means by the cycle rider.

15. A cycle saddle mounting assembly for mounting at a fixed location on a cycle frame in an upwardly projecting tubular frame member of the cycle frame having means for journaling a crank supporting a pair of cycle pedals, said assembly comprising:
   a unitary frame mounting means for mounting said assembly in said tubular frame member;
   saddle mounting means for accommodating the mounting of a cycle saddle thereon; and
   articulated linkage means, coupled between said unitary frame mounting means and said saddle mounting means, for operatively moving said saddle mounting means to, and securing said saddle mounting means at, selected positions along a path relative to said frame mounting means between a predetermined standard riding position and a relatively more rearward position; and wherein said linkage means comprises:
   means for maintaining said saddle mounting means in the same angular orientation independent of said position of said saddle mounting means;
   a pair of elongated, parallel, and articulated substantially rigid bars extending between said frame mounting means and said saddle mounting means;
   means for pivotally mounting one end of each said bar to said frame mounting means; and
   means for pivotally mounting the other end of each said bar to said saddle mounting means; whereby pivotal movement of said bars is effective to move said saddle mounting means along said arcuate path while maintaining said saddle mounting means in the same angular orientation independent of said position of said saddle mounting means.

16. The assembly as claimed in claim 15, wherein said bars are mounted so as to be in parallel relationship with each other at all positions of said bars.

17. The assembly as claimed in claim 15, comprising securing means for securing said saddle mounting means at at least said rearward and forward positions, said securing means comprising:
   an indexing locking element on one of said saddle mounting means and said linkage means; and
   a plurality of registration means on the other of said saddle mounting means and said linkage means; whereby
   said linkage means and, consequently, said saddle mounting means, are locked into fixed positions upon engagement of said indexing locking means with said registration means.

18. The assembly as claimed in claim 7, wherein:
   said locking element is pivotally mounted on said linkage means and includes an operating lever for pivoting said locking element on said linkage when moved, to selectively move said dog member into and out of engagement in said detects; and
   said assembly further comprises a spring means located between said operating lever and said linkage means for biasing said dog member into engagement in said detents.

19. A cycle saddle mounting assembly for mounting at a fixed location on a cycle frame in an upwardly projecting tubular frame member of the cycle frame having means for journaling a crank supporting a pair of cycle pedals, said assembly comprising:
   a unitary frame mounting means for mounting said assembly in said tubular frame member;
   saddle mounting means for accommodating the mounting of a cycle saddle thereon; and
   articulated linkage means, coupled between said unitary frame mounting means and said saddle mounting means, for operatively moving said saddle mounting means to, and securing said saddle mounting means at, selected positions along a path relative to said frame mounting means between a predetermined standard riding position and a relatively more rearward position; and wherein
   said articulated linkage means operatively moves said saddle mounting means along said path while maintaining a substantially constant distance between said saddle mounting means and the crank of the cycle pedals.

* * * * *